United States Patent [19]

Kaye

[11] 4,217,967
[45] Aug. 19, 1980

[54] ROLLERS
[76] Inventor: Ronald S. Kaye, 112 Kunyung Rd., Mt. Eliza, 3930 Victoria, Australia
[21] Appl. No.: 882,359
[22] Filed: Mar. 1, 1978
[30] Foreign Application Priority Data
Mar. 3, 1977 [AU] Australia ............... PC9263
[51] Int. Cl.² .................................... B60D 57/00
[52] U.S. Cl. ...................... 180/20; 280/47.24; 404/123
[58] Field of Search ............... 180/20, 6.66; 280/47.24; 404/123, 122
[56] References Cited
U.S. PATENT DOCUMENTS
2,200,921  5/1940  Granell ................ 280/47.24 X
2,936,840  5/1960  White ................... 180/6.66
3,045,467  9/1962  Seiler ................... 180/20

Primary Examiner—John A. Pekar
Attorney, Agent, or Firm—Andrus, Sceales, Starke & Sawall

[57] ABSTRACT

The present invention provides a roller comprising a first frame, generally parallel first and second roll means mounted to the first frame for rotation about axes which, in one position of the first frame, lie in a generally horizontal plane, a second frame, a third roll means mounted to the second frame for rotation about a generally horizontal axis, and means mounting the first and second frames together for rotation relative to one another about a generally vertical axis whereby steering of the roller may be effected.

6 Claims, 2 Drawing Figures

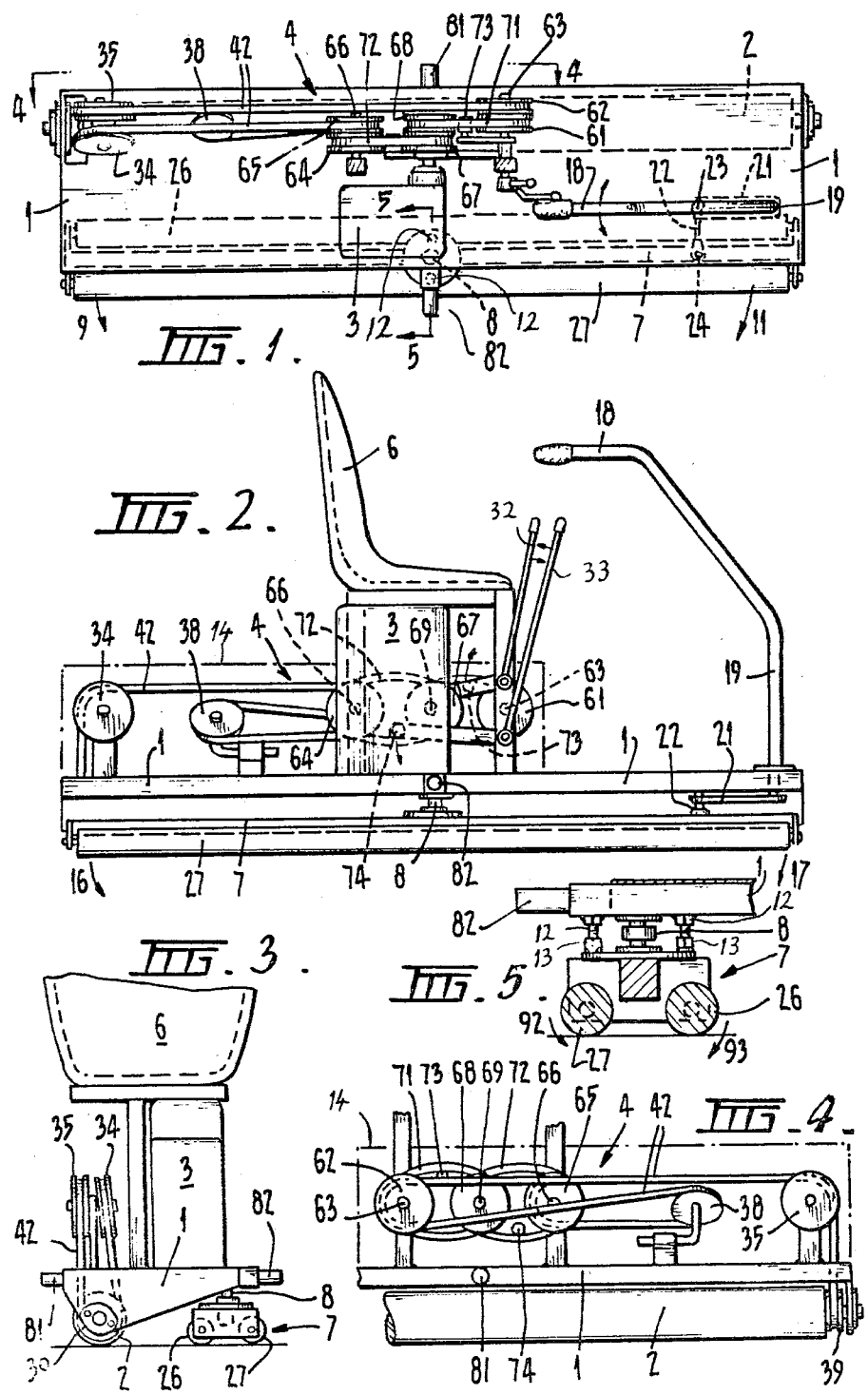

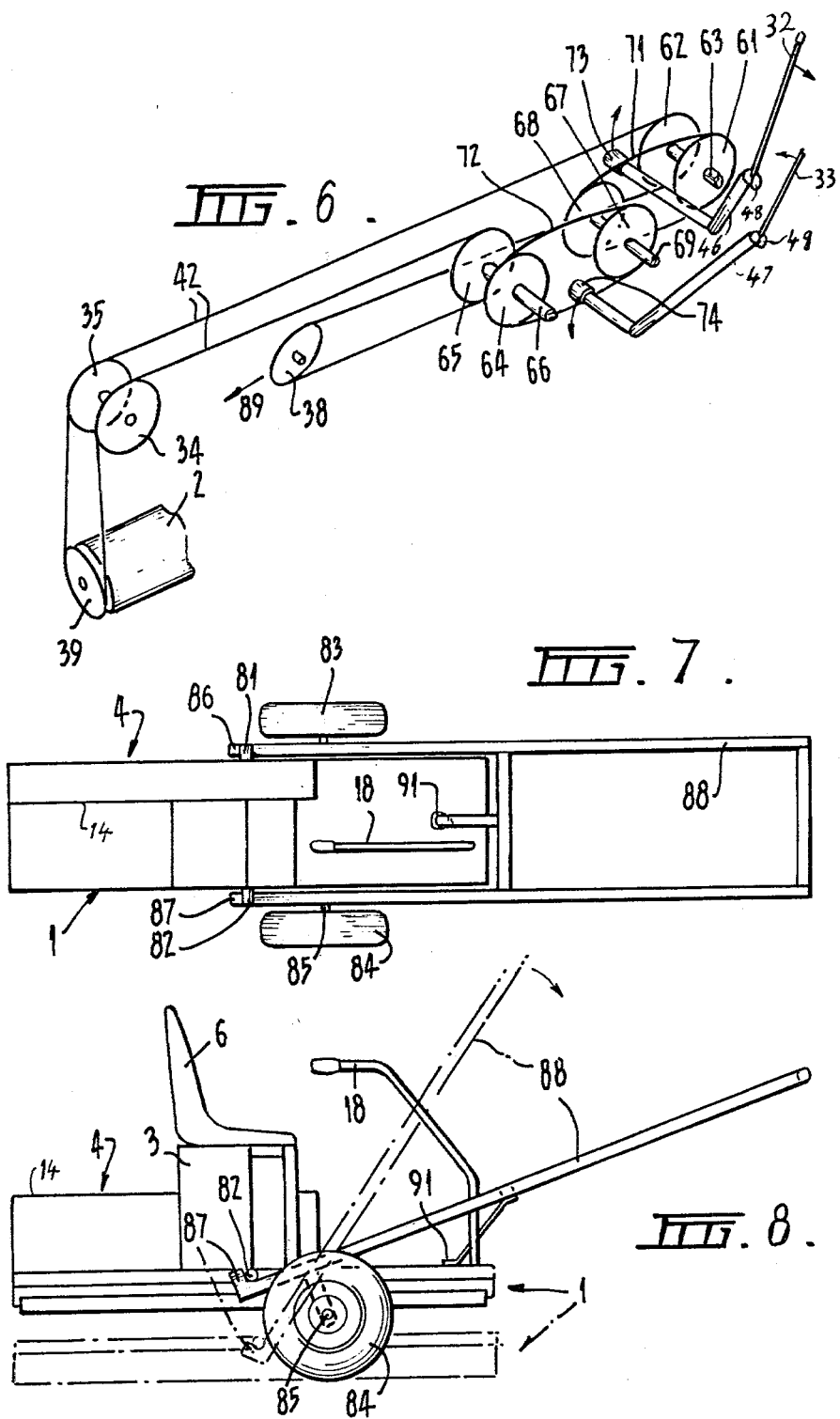

ROLLERS

FIELD OF THE INVENTION

This invention relates to rollers.

BACKGROUND OF THE INVENTION

Motorized rollers are well known for use in rolling bowling greens, cricket pitches and tennis courts. There is, however, a need for rollers which are of simple construction.

SUMMARY OF THE INVENTION

The present invention provides a roller comprising a first frame, generally parallel first and second roll means mounted to the first frame for rotation about axes which, in one position of the first frame, lie in a generally horizontal plane, a second frame, a third roll means mounted to the second frame for rotation about a generally horizontal axis, and means mounting the first and second frames together for rotation relative to one another about a generally vertical axis whereby steering of the roller may be effected.

In another aspect, the present invention provides a roller comprising a first frame, generally parallel first and second roll means mounted to the first frame for rotation about axes which, in one position of the first frame, lie in a generally horizontal plane, a second frame, means mounting the first frame to the second frame for rotation of the first frame with respect to the second frame about a generally vertical plane and for movement of said first frame about a generally horizontal axis transverse to said axes, and third roll means mounted to the second frame for rotation about a generally horizontal axis.

The axis of the third roll means is preferably mounted so as not to move relative to the second frame. The axes of the first and second roll means are preferably mounted so as not to move relative to the first frame.

The third roll means may be a single roll or may comprise two axially aligned rolls which may be spaced apart. The first and second roll means preferably each comprise a single roll having a continuous cylindrical surface.

It is preferred that said means mounting the first and second frames together permits relative rotation of the first and second frames about a generally horizontal axis extending in the direction of normal travel of the roller.

It is preferred that there is means restricting each of the first and second roll means against upward and downward movement without concommitant movement of the other of the first and second roll means. It is also preferred that there is means restricting each of the first and second roll means against pivoting in a vertical plane generally about the axis of the other of the first and second roll means. These features have an important effect in avoiding or reducing corrugations.

Further, it is preferred that the spacing of said axes, and the spacing of the axis of the third roll means from the adjacent one of said axes are substantially different. This spacing is preferably 1¼ times or greater and also reduces corrugations.

It is most desirable that a simple drive means be provided for the above described roller. It is particularly desirable that such a drive means does not involve the use of a chain which requires oiling as oil is very detrimental to bowling greens.

Accordingly, in a preferred aspect the present invention provides the above described roller in association with drive means comprising a belt in the form of a closed loop having first and second strings adapted to frictionally engage with a drive surface to drive the third roll means and including transmission means is provided adapted to impart drive to a selected one of said strings.

The transmission means preferably includes means adapted to move a selected one of said strings into drive engagement with a drive surface which, in use, is driven by a motor.

By the use of such a drive means forward reverse and braking motion can be had.

Said means adapted to move a selected one of said strings into drive engagement preferably comprises means adapted to deform the selected string.

As it is desirable that the roller be as wide as possible for the purposes of reducing rolling time by reducing the number of passes over an area to cover that area and to produce high quality rolling it may be that the roller will have difficulty in passing through gateways, up ramps and between obstructions.

Accordingly, it is preferred that the roller is wider than it is long. In this respect, it is preferred that the roller is at least 1½ or twice as wide as it is long. It is also preferred that the length of the roller is not in excess of 3, preferably 2, feet long. Further, a wheeled lifting device is provided adapted to lift the roller at its front and rear and to carry the roller sideways.

The wheeled lifting device preferably has an axle for wheels thereof, arms extending to one side of the axle and adapted to engage with the roller and a lever arm adapted to pivot said arms about the axis of the axle to lift the roller. It is preferred that an abutment, which may conveniently be the axle, is provided against which the roller may abut so as to at least substantially reduce or limit rocking of the roller when carried by the lifting device.

DESCRIPTION OF THE VIEWS OF THE DRAWINGS

FIG. 1 is a top plan view of a roller but with certain parts not shown to aid clarity, FIG. 2 is a front elevation of the roller, FIG. 3 is a side elevation of the roller, FIG. 4 is a detail view of part of the roller, FIG. 5 is a cross-section on line 5—5 in FIG. 1, FIG. 6 is a perspective detail of a transmission of the roller.

FIG. 7 is a top plan view of the roller in association with a lifting device, certain parts of the roller not being shown to aid clarity, and FIG. 8 is a front elevation of the roller in association with the lifting device; certain parts of the roller not being shown to aid clarity.

DETAILED DESCRIPTION

The roller shown in the drawings comprises a main frame 1 to which a first roll 2, which is a single roll or which is comprised of two axially aligned roll means, is mounted to rotate. The axis of the first roll 2 is rigidly mounted with respect to the frame 1.

Mounted on the frame 1 is an engine compartment 3 containing an engine (not shown) which, via a drive, indicated generally by 4, can drive the first roll 2. A driver's seat 6 is positioned over the engine compartment 3.

A second frame 7 is mounted to the main frame 1 by a pivot axis 8 which enables the frame 7 to turn in the direction of arrows 9 and 11. Further, the frame 7 is pivotally mounted with respect to axis 8 to enable it to rock as indicated by arrows 16 and 17. Note, however, that the frame 7 is provided with bolts 12 and lock nuts 13 therefor. The bolts 12 bear on the frame 1 and restrict the frame 7 from moving in the direction of arrows 92 and 93. This last has an important effect in reducing corrugations. A steering mechanism for the frame 7 is provided and comprises a tiller 18, rotatable tiller post 19, cranks 21 and 22 and pivot joints 23 and 24. The frame 7 carries rolls 26 and 27 which lie parallel and have axes which are rigidly mounted with respect to the frame.

Note that the spacing of the roll 2 from the roll 26 is different to the spacing of the rolls 26 and 27. This spacing may be more or less but more is preferred and 1¼ times or greater is most preferred.

The drive 4 includes the aforesaid engine and a specific drive is shown in FIGS. 4 and 6. A cover for the drive is shown by dash-dot lines 14 in FIGS. 2 and 4 and by solid line in FIGS. 7 and 8.

The driven shown in FIGS. 4 and 6 comprises a shaft 69 which is driven by the engine, drive pulleys 67 and 68 which are mounted on the shaft 69, idler pulleys 34; 35, 38 and 62, a pulley 39 mounted to the roller 2 and a drivebelt 42.

In addition, a pulley 61 is mounted with the pulley 62 to rotate together on a shaft 63 and pulleys 64 and 65 are mounted to rotate together by means of a shaft 66.

Drive direction means including jockey rollers 73 and 74 which are mounted on levers 46 and 47 and which levers can pivot about pivot points 48 and 49. The levers 46 and 47 are connected to arms 32 and 33.

By means of the arms 32 and 33 a selected one of the rollers 73 and 74 may engage the respective one of belts 71 and 72 and cause forward or reverse drive or braking to be obtained.

Pulley 38 may be biased in the direction of arrow 89 to take the slack in the belt 42.

Still further, it is desirable that the rollers 26 and 27 are of the same axial length as the roll 2.

In use of the above roller, the rolls 2, 26 and 27 serve to roll effectively and this is improved by the moveability and limits of moveability of the frame 7. Further, the rolls 26 and 27 are desirably smaller than the roll 2 and preferred dimensions are respectively less than 3 inches and greater than 4 inches.

In general, it will be desirable for the roller to be not less than 3 feet wide and a length, measured in the parallel direction of motion, of about 1–2'6" foot will be usual. However, the 3 foot or more width will not easily pass through some gateways and thus the roller is provided with lifting pins 81 and 82 which are desirably located to one side of the centre of gravity of the roller.

The lifting device includes wheels 83 and 84, axles 85 and lifting arms 86 and 87 and a draw bar 88 which are secured to the axles 85.

In use, the lifting arms 86 and 87 engage with the pins 81 and 82 and by turning axles 85 with the bar 88 the roller will be lifted. This lifting, being to one side of the centre of gravity, will cause the roller to abut against an abutment 91 to limit rocking.

A 4 stroke non-oiling motor is preferably used as these are not so likely to pollute lawns.

Modifications and adaptations may be made to the above described without departing from the spirit and scope of this invention which includes every novel feature and combination of features disclosed herein.

The claims form part of the disclosure of this specification.

I claim:

1. A roller apparatus for compacting and smoothing a grassy surface by movement along a line of travel, said apparatus having a predetermined width parallel to the line of travel which is small compared to its length for permitting the apparatus to be moved through narrow openings, said apparatus comprising:
   a first, elongated frame;
   parallel, closely spaced, elongated first and second roll means mounted in said first frame with the axes of rotation lying parallel to the direction of elongation of said first frame;
   a second elongated frame;
   a third elongated roll means rotatably mounted in said second frame with the axis of rotation lying parallel to the direction of elongation of said second frame, said first and second frames and associated roll means being capable of assuming a generally horizontal orientation during application to the surface to be compacted and smoothed;
   drive means drivingly connected to at least one of said roll means for propelling said roller apparatus in the line of travel generally normal to the axis of said third roll means; and
   means coupling said first and second frames together for positioning said first and second roll means in close proximity to said third roll means to form the small width dimension of said roller apparatus and concentrate its compacting and smoothing weight, said coupling means providing pivoting of said first frame with respect to said second frame about a generally vertical axis for steering said roller apparatus, said coupling preventing pivoting of said first frame with respect to said second frame about a horizontal axis normal to the line of travel of said roller;
   said roller means being so mounted in said frames as to be restrained against movement with respect to said frames other than rotation about their axes.

2. A roller apparatus as claimed in claim 1 wherein said coupling means is further defined as permitting pivoting of said first frame with respect to said second frame about a horizontal axis parallel to the direction of travel of said roller.

3. A roller apparatus as claimed in claim 1 wherein the spacing between said first and second roll means and the spacing between the third roll means and the adjacent one of said first and second roll means are different.

4. A roller apparatus as claimed in claim 1 wherein said roller apparatus has a dimension parallel to the line of travel not in excess of 3 feet and a substantial greater dimension transverse to the line of travel.

5. A roller apparatus according to claim 4 further having a lifting device couplable thereto, said lifting device having wheels, axle means for said wheels, roller apparatus engaging means mounted on said axle means and adapted to engage the roller apparatus, and a lever arm adapted to pivot said roller apparatus engaging means about said axle to lift said roller apparatus for transportation sideways with respect to its line of travel.

6. A roller apparatus as claimed in claim 1 wherein said drive means includes a motor, first and second drive surfaces selectively driveable by said motor, a belt in the form of a closed loop drivingly coupled to a roll means of said roller apparatus for rotating said roll means, said closed loop belt having first and second strings engaging said first and second drive surfaces, respectively, for moving said belt in opposite directions, and transmission means adapted to selectively drive one of said driving surfaces to rotate said roll means in a desired direction.

* * * * *